(No Model.)
J. M. DAVIS & D. H. BROWN.
MECHANICAL POWER.
No. 280,357. Patented July 3, 1883.
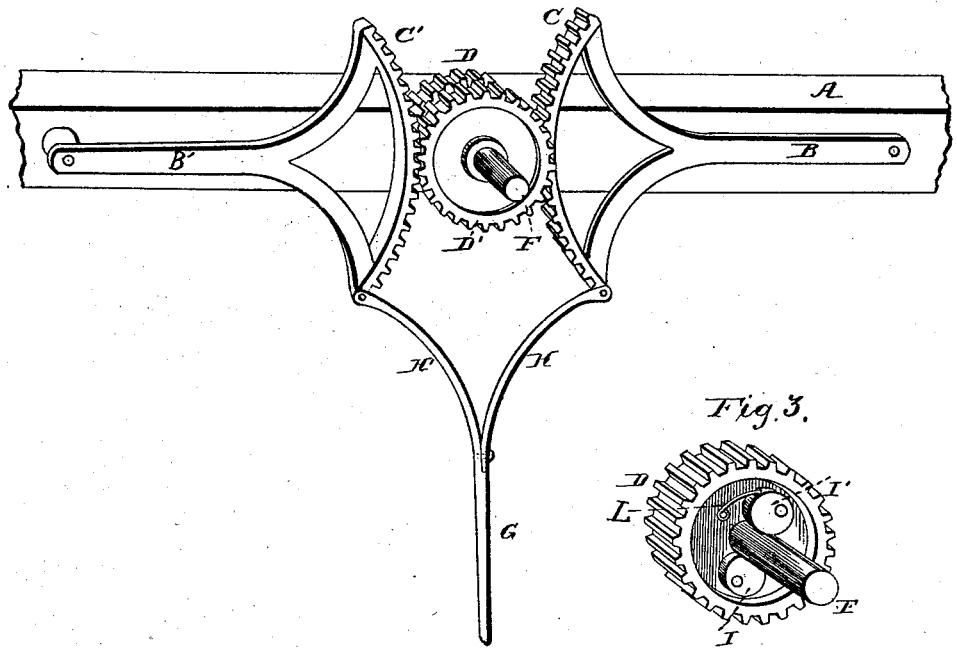
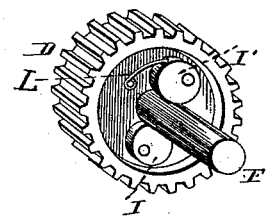
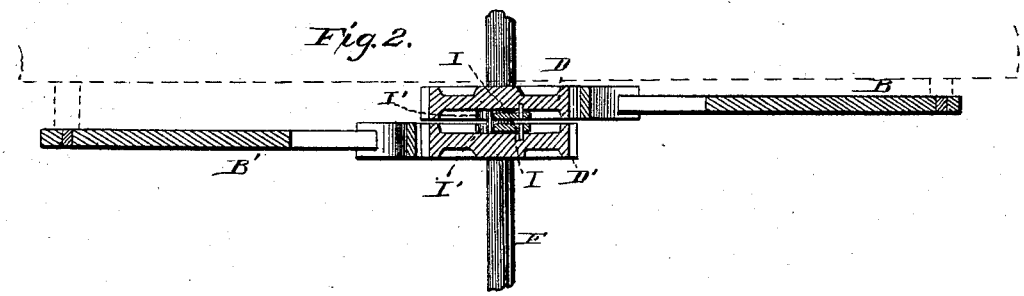
WITNESSES: INVENTOR.
Fred. G. Dieterich John M. Davis & David H. Brown
Jno. H. Stockett By Daniel Breed ATTORNEY.

UNITED STATES PATENT OFFICE.

JOHN M. DAVIS AND DAVID H. BROWN, OF LINCOLN, VIRGINIA.

MECHANICAL POWER.

SPECIFICATION forming part of Letters Patent No. 280,857, dated July 3, 1883.

Application filed November 7, 1882. (No model.)

*To all whom it may concern:*

Be it known that we, JOHN M. DAVIS and DAVID H. BROWN, citizens of the United States, residing at Lincoln, in the county of Loudoun and State of Virginia, have invented certain new and useful Improvements in Mechanical Powers; and we do hereby declare the following to be a full, clear, and exact description of the invention, such as will enable others skilled in the art to which it appertains to make and use the same.

The object of our invention is to convert direct or piston motion into rotary motion; and our invention consists of certain combinations of devices, which will be fully understood by the following description and claims.

In the accompanying drawings, Figure 1 is a front or direct view of our combined devices. Fig. 2 is a section of the same. Fig. 3 is a detached view of one of the pinions and its shaft, also showing the clutch.

Upon a suitable frame, A, are pivoted two swinging and bifurcated arms, B B', each being cast in the same piece with its toothed segment C or C', respectively. Between said segments, and having a bearing in said frame, is a shaft, F, provided with two pinions, D D', one of which gears into segment C and the other into segment C'. Each of these pinions D D' is milled out on the inner side, thus forming a recess in which are placed two disks, I I', and eccentrically pivoted to the pinion, as seen in Fig. 3, so as to form a friction-clutch in order to alternately seize the shaft F and release the same when the machine is in motion. These disks are provided with springs L, to gently press them toward the shaft F, and thus secure the clutch action. The piston-rod G is pivoted to one of the arms, H, which arms are in turn pivoted to the segments C C'. By this construction, when the piston-rod G and segments C C' are moved forward, the pinion D is clutched to the shaft F, which thus receives a rotary motion, while the pinion D' plays loose; and when the piston-rod G moves back, the friction-clutch in pinion D seizes the shaft F, and thus continues the rotation.

In case of heavy machines, we may find it better to use ratchets in place of the friction-clutch.

Our invention is applicable to sewing-machines, wind-engines, and various other machines.

Having described our invention, we claim—

1. The swinging arms B B', pivoted to the frame A, and having toothed segments C C', and the piston-rod G, provided with arms H H', pivoted to segments C C', combined with the milled pinion D D' and shaft F, said pinions having eccentrically-pivoted disks provided with pawls, substantially as and for the purposes set forth.

2. In the above-described device, the milled pinions D D', having eccentrically-pivoted disks provided with pawls, combined with shaft F and frame A, substantially as and for the purposes set forth.

In testimony whereof we affix our signatures in presence of two witnesses.

JOHN M. DAVIS.
    DAVID H. BROWN.

Witnesses:
 H. T. DAVIS,
 S. B. DAVIS.